(12) United States Patent
Zhu

(10) Patent No.: US 11,902,965 B2
(45) Date of Patent: Feb. 13, 2024

(54) UPLINK TRANSMISSION METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 310 days.

(21) Appl. No.: 17/417,011

(22) PCT Filed: Dec. 20, 2018

(86) PCT No.: PCT/CN2018/122410
§ 371 (c)(1),
(2) Date: Jun. 21, 2021

(87) PCT Pub. No.: WO2020/124497
PCT Pub. Date: Jun. 25, 2020

(65) Prior Publication Data
US 2022/0116963 A1    Apr. 14, 2022

(51) Int. Cl.
*H04W 72/1268* (2023.01)

(52) U.S. Cl.
CPC ............... *H04W 72/1268* (2013.01)

(58) Field of Classification Search
CPC .................................. H04W 72/1268
See application file for complete search history.

(56) References Cited

U.S. PATENT DOCUMENTS

| 9,967,802 B2 | 5/2018 | Malladi et al. |
| 2015/0365880 A1* | 12/2015 | Malladi ............... H04W 48/12 370/312 |
| 2017/0149591 A1 | 5/2017 | Manolakos et al. |
| 2017/0156075 A1 | 6/2017 | Harada et al. |
| 2017/0215171 A1 | 7/2017 | Sun et al. |
| 2017/0230997 A1 | 8/2017 | Damnjanovic et al. |
| 2017/0290040 A1 | 10/2017 | Dinan |

(Continued)

FOREIGN PATENT DOCUMENTS

| CN | 101801101 A1 | 8/2010 |
| CN | 105992279 A | 10/2016 |
| CN | 106304298 A | 1/2017 |

(Continued)

OTHER PUBLICATIONS

The Partial Supplementary European Search Report issued in Application No. 18943690.0, dated Jun. 14, 2022,(14p).

(Continued)

*Primary Examiner* — Kevin M Cunningham
(74) *Attorney, Agent, or Firm* — Arch & Lake LLP

(57) ABSTRACT

An uplink transmission method and an apparatus thereof are provided. The method includes that a terminal in an unlicensed spectrum determines a target indication parameter, where the target indication parameter is used for indicating a target transmission mode adopted when a terminal transmits uplink data. The method further includes that the terminal determines the target transmission mode according to the target indication parameter and transmits the uplink data to a base station in the unlicensed spectrum on the basis of the target transmission mode.

12 Claims, 12 Drawing Sheets

(56) References Cited

U.S. PATENT DOCUMENTS

2018/0367282 A1 12/2018 Li et al.
2020/0213033 A1* 7/2020 Chen .................... H04W 72/23

FOREIGN PATENT DOCUMENTS

CN  108988995 A1  12/2018
WO  2017076157 A1  5/2017
WO  2018219353 A1  12/2018

OTHER PUBLICATIONS

INOA of Application No. 202127031690 dated Aug. 8, 2022 with English translation,(6p).
3GPP TR 23.731 V0.6.0 (Aug. 2018); 3rd Generation Partnership Project; Technical Specifictaion Group Services and System Aspects; Study on Enhancement to the 5GC LoCation Services (Release 16),(144p).
International Search Report issued in PCT/CN2018/122410 dated Aug. 7, 2019 with English translation, (4p).
First Office Action issued to Chinese Application No. 201880003016.4 dated Jan. 4, 2021, (15p).
Extended European Search Report issued in Application No. 18943690.0, dated Oct. 20, 2022,(16p).

\* cited by examiner

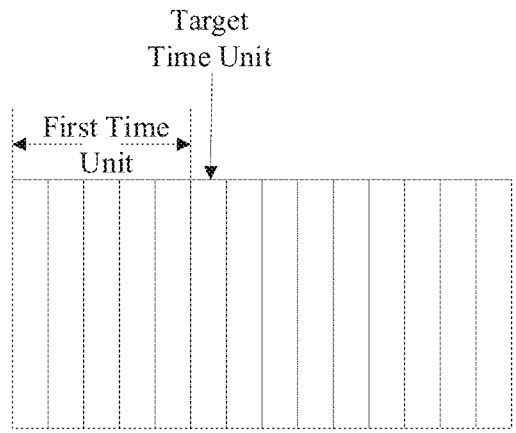
FIG. 5
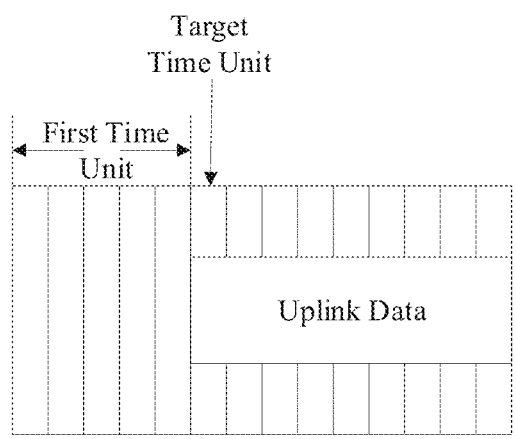
FIG. 6
| selecting at least one of a preset number of candidate data packets as the target data packet | — 101-1 |
| starting from a first one of the time unit after the target time unit, transmitting the target data packet to the base station according to a preset data packet transmission sequence, after the uplink data is carried by the target data packet | — 101-2 |
FIG. 7

UPLINK TRANSMISSION METHOD AND APPARATUS

CROSS-REFERENCE TO RELATED APPLICATION

The present application is the US national phase application of International Application No. PCT/CN2018/122410, filed on Dec. 20, 2018, the entire contents of which are hereby incorporated by reference for all purposes.

TECHNICAL FIELD

The present disclosure relates to the field of communications, and in particular to an uplink transmission method and apparatus.

BACKGROUND

For an LTE (Long Term Evolution) system, uplink and downlink transmissions of a terminal are performed based on scheduling of a base station.

SUMMARY

According to a first aspect of the present disclosure, there is provided an uplink transmission method applied to a terminal in an unlicensed spectrum. The method includes that the terminal determines a target indication parameter, where the target indication parameter is used for indicating a target transmission mode adopted in response to determining that the terminal transmits uplink data.

Further, the terminal determines the target transmission mode according to the target indication parameter.

Moreover, the terminal transmits the uplink data to a base station in the unlicensed spectrum on the basis of the target transmission mode.

According to a second aspect of the present disclosure, there is provided an uplink transmission method applied to a base station in an unlicensed spectrum. The method includes that the base station sends indication information for indicating a target modulation and coding scheme to a terminal through a scheduling signaling, where a value of a target indication parameter corresponding to the target modulation and coding scheme is determined by the terminal according to a predetermined mapping relationship between multiple modulation and coding schemes and multiple candidate values of the target indication parameter in a one-to-one correspondence.

Further, the target modulation and coding scheme is a modulation and coding scheme adopted in response to determining that the terminal transmits the uplink data. Furthermore, the target indication parameter is used for indicating a target transmission mode adopted in response to determining that the terminal transmits uplink data.

Moreover, the base station receives the uplink data transmitted by the terminal based on the target transmission mode.

According to a third aspect of the present disclosure, there is provided a computer-readable storage medium having a computer program stored thereon, where the computer program is configured to execute the uplink transmission method described in the first aspect.

According to a fourth aspect of the present disclosure, there is provided a computer-readable storage medium having a computer program stored thereon, where the computer program is configured to execute the uplink transmission method described in the second aspect.

According to a fifth aspect of the present disclosure, there is provided an uplink transmission apparatus including: a processor; and a memory for storing executable instructions of the processor.

Further, the processor is configured to determine a target indication parameter, where the target indication parameter is used for indicating a target transmission mode adopted in response to determining that the terminal transmits uplink data.

Additionally, the processor is configured to determine the target transmission mode according to the target indication parameter.

Moreover, the processor is configured to transmit the uplink data to a base station in an unlicensed spectrum on the basis of the target transmission mode.

According to a sixth aspect of the embodiments of the present disclosure, there is provided an uplink transmission apparatus including: a processor; and a memory for storing executable instructions of the processor.

Further, the processor is configured to send indication information for indicating a target modulation and coding scheme to a terminal through a scheduling signaling, where a value of a target indication parameter corresponding to the target modulation and coding scheme is determined by the terminal according to a predetermined mapping relationship between multiple modulation and coding schemes and multiple candidate values of the target indication parameter in a one-to-one correspondence.

Additionally, the target modulation and coding scheme is a modulation and coding scheme adopted in response to determining that the terminal transmits the uplink data, and the target indication parameter is used for indicating a target transmission mode adopted in response to determining that the terminal transmits uplink data.

Moreover, the processor is configured to receive the uplink data transmitted by the terminal based on the target transmission mode.

It should be noted that the above general description and the following detailed description are merely exemplary and explanatory and should not be construed as limiting of the disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

FIG. 5 is a schematic diagram showing an uplink transmission scenario according to an exemplary embodiment.

FIG. 6 is a schematic diagram showing another uplink transmission scenario according to an exemplary embodiment.

FIG. 7 is a flowchart showing another uplink transmission method according to an exemplary embodiment.

DETAILED DESCRIPTION

Exemplary embodiments will be described in detail herein, examples of which are illustrated in the accompanying drawings. When the following description refers to the drawings, the same numbers in different drawings indicate the same or similar elements unless otherwise indicated. The embodiments described in the following exemplary embodiments do not represent all embodiments consistent with the present invention. Instead, they are merely examples of devices and methods consistent with aspects of the present invention as detailed in the appended claims.

The terms used in the present disclosure are merely for the purpose of describing particular embodiments and are not intended to limit the present disclosure. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "upon" or "when" or "in response to determination".

The following first introduces an uplink transmission method provided by the embodiments of the present disclosure from a terminal side in an unlicensed spectrum.

Figure 1A:
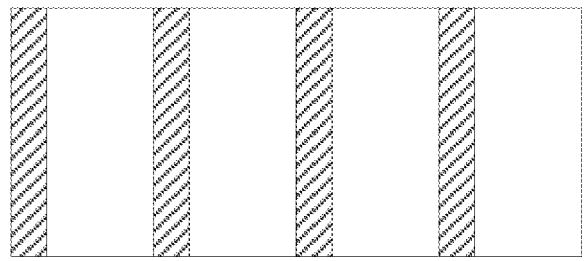
FIGS. 1A to 1C are schematic diagrams of uplink transmission scenarios according to comparison embodiments of the present disclosure.

According to comparison embodiments of the present disclosure, for dynamic scheduling, one scheduling signaling may only indicate data transmission on one time unit, as shown in FIG. 1A.

However, for the terminal working in an unlicensed spectrum, when the terminal needs to occupy a channel, it has to first monitor whether the channel is idle. Only when the channel is in an idle state, the terminal may occupy the channel. In the comparison embodiment, a starting position for the terminal performing uplink transmission is indicated based on a scheduling signaling or pre-configured by the base station for the terminal. However, due to uncertainty of channel occupancy on the unlicensed spectrum, a starting position of the uplink data transmission is also uncertain.

Figure 1B:
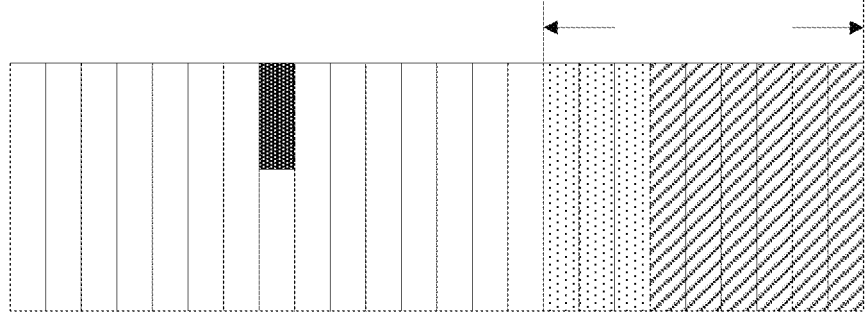

In order to solve this problem, the terminal may start the uplink data transmission only when it monitors that the channel is in the idle state. For example, as shown in FIG. 1B, the terminal transmits uplink data on a time unit when the channel is in the idle state. However, in this way, if the number of time units corresponding to the channel in the idle state monitored by the terminal is small, the transmitted data cannot be decoded on a base station side, resulting in a waste of transmission resources.

Figure 1C:
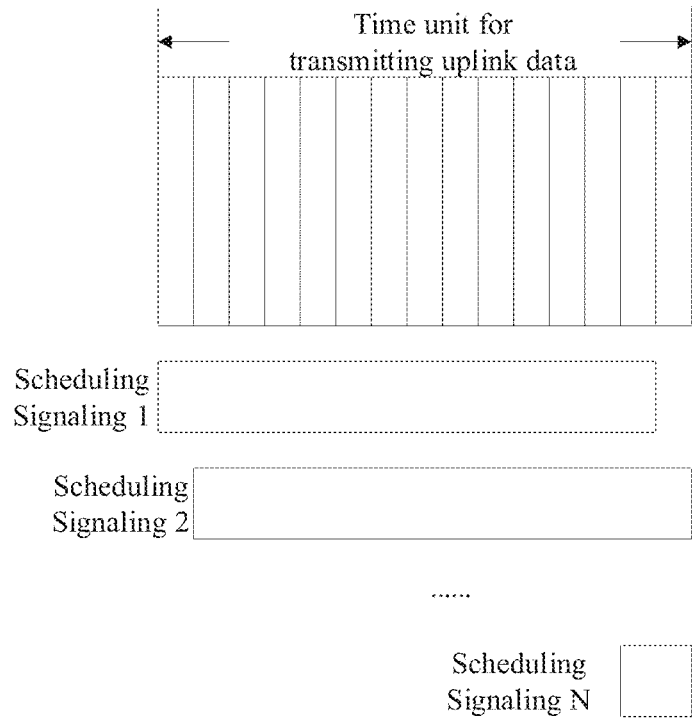

Alternatively, the terminal may also indicate scheduling information of a data packet through a corresponding scheduling instruction for each possible starting position of uplink data transmission, as shown in FIG. 1C. Scheduling signaling 1 corresponds to scheduling information indicating that the starting position of the terminal to transmit the uplink data is time unit 0, and scheduling signaling 2 corresponds to scheduling information indicating that the starting position of the terminal to transmit the uplink data is time unit 1, and so on. However, in this way, the base station needs to transmit multiple scheduling instructions, which will also cause a waste of resources.

Figure 2:
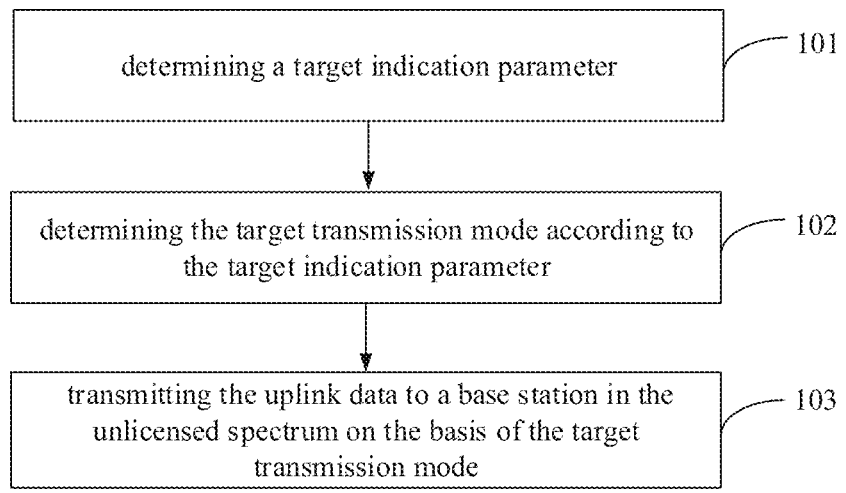
FIG. 2 is a flowchart showing an uplink transmission method according to an exemplary embodiment.

The embodiments of the present disclosure provide an uplink transmission method, which may be applied to a terminal in the unlicensed spectrum. Referring to FIG. 2, FIG. 2 is a flowchart showing an uplink transmission method according to an exemplary embodiment, which may include the following steps:

in step 101, a target indication parameter is determined; the target indication parameter is used for indicating a target transmission mode that should be adopted when the terminal transmits uplink data;

in step 102, the target transmission mode is determined according to the target indication parameter; and in step 103, the uplink data is transmitted to a base station in an unlicensed spectrum on the basis of the target transmission mode.

In the above embodiment, the terminal in the unlicensed spectrum may first determine the target indication parameter, and then determines the target transmission mode that should be adopted when transmitting the uplink data according to the target indication parameter, and transmits the uplink data to the base station in the unlicensed spectrum based on the target transmission mode. Through the above processes, the target transmission mode that should be adopted when the terminal transmits the uplink data may be indicated by the target indication parameter, which solves a problem of resource waste caused by the uncertainty of channel occupation in the unlicensed spectrum.

For the above step 101, the terminal may use any of the following methods to determine a target value of the target indication parameter.

A first method is to obtain the target indication parameter predefined in a protocol.

In this way, the value of the target indication parameter may be specified in the protocol in advance, and the terminal may directly obtain the value of the target indication parameter.

A second method is to receive the target indication parameter sent by the base station through a preset signaling.

Optionally, the preset signaling may be a RRC (Radio Resource Control) signaling, a MAC (Media Access Control) CE (Control Element) or a physical layer signaling, such as a scheduling signaling.

In this manner, the base station may configure the value of the target indication parameter for the terminal, and send the value of the target indication parameter to the terminal through the preset signaling.

Optionally, the base station may also preset an information domain corresponding to the target indication parameter in the scheduling signaling, and the terminal reads a value of the information domain and uses the read value as the value of the target indication parameter.

In the above two methods, the terminal may directly obtain the value of the target indication parameter. In the embodiments of the present disclosure, optionally, the terminal may also obtain the value of the target indication parameter in the following indirect method.

Figure 3:
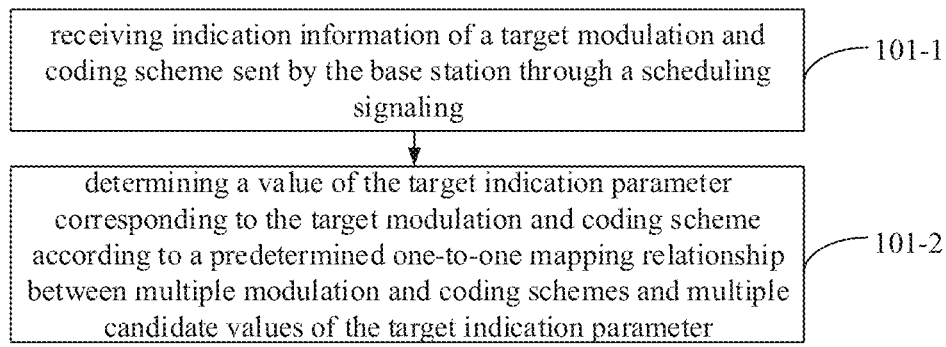
FIG. 3 is a flowchart showing another uplink transmission method according to an exemplary embodiment.

In a third method, FIG. 3 is a flowchart showing another uplink transmission method according to an embodiment shown in FIG. 2, and with reference to FIG. 3, the step 101 may include the following steps:

in step 101-1, indication information for indicating a target modulation and coding scheme sent by the base station through a scheduling signaling is received;

the target modulation and coding scheme is a modulation and coding scheme that should be adopted when the terminal transmits the uplink data.

In this step, the base station may indicate the target modulation and coding scheme that should be adopted when the terminal transmits the uplink data through the scheduling signaling.

In step 101-2, a value of the target indication parameter corresponding to the target modulation and coding scheme is determined according to a predetermined mapping relationship between multiple modulation and coding schemes and multiple candidate values of the target indication parameter in a one-to-one correspondence.

In the embodiments of the present disclosure, optionally, the base station may send the mapping relationship to the terminal in advance through the RRC signaling, the MAC CE, or the physical layer signaling, or may predefine the mapping relationship in the protocol. The preset relationship may be as shown in Table 1.

TABLE 1

| modulation and coding scheme | candidate value |
|---|---|
| modulation and coding scheme 1 | $X_1$ |
| modulation and coding scheme 2 | $X_2$ |
| . . . | . . . |
| modulation and coding scheme N | $X_N$ |

After determining the target modulation and coding scheme, the terminal may look up the candidate value corresponding to the target modulation and coding scheme according to Table 1, and the candidate value is the value of the target indication parameter.

For example, if the target modulation and coding scheme is modulation and coding scheme 2, then $X_2$ is the value of the target indication parameter.

In the embodiments of the present disclosure, the terminal may use any of the above methods to determine the value of the target indication parameter. Optionally, the value of the target indication parameter may be a fixed value or a variable value, which is adjusted by the base station at any time according to a channel condition. Alternatively, the protocol or the base station may specify a range value to which the value of the target indication parameter belongs, for example, the range value is (0,1), and then the base station specifies a specific value of the target indication parameter within the above range value according to the channel condition.

Figure 4:
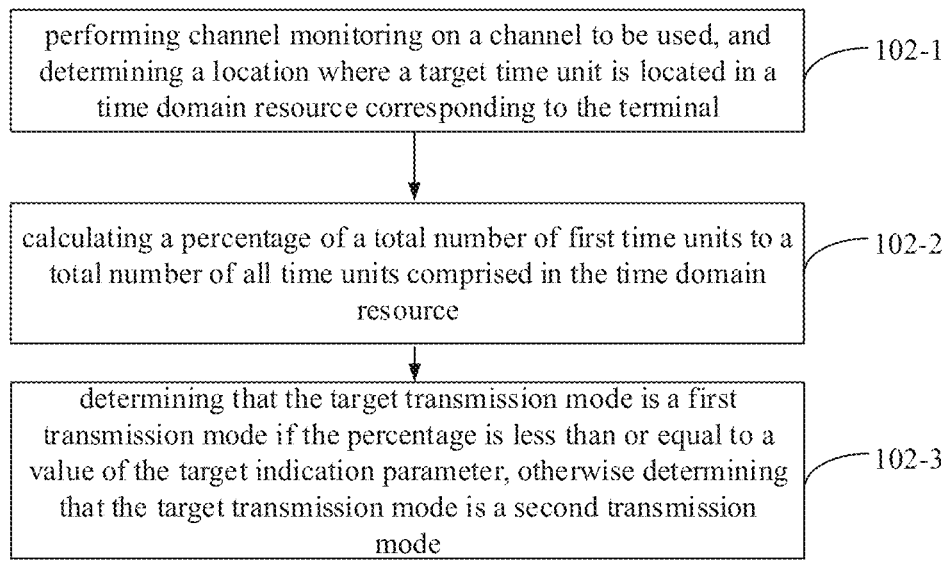
FIG. 4 is a flowchart showing another uplink transmission method according to an exemplary embodiment.

For the above step 102, FIG. 4 is a flowchart showing another uplink transmission method according to an embodiment shown in FIG. 2, and with reference to FIG. 4, the step 102 may include the following steps:

In step 102-1, channel monitoring is performed on a channel to be used, and a location where a target time unit is located is determined in a time domain resource corresponding to the terminal.

In this step, the base station may preconfigure the corresponding time domain resources for the terminal to transmit the uplink data. When the terminal needs to perform the uplink transmission, it may first perform the channel monitoring on the channel to be used, and determines a starting time unit when the channel is in the idle state, that is, determining the location where the target time unit is located.

In step 102-2, a percentage of a total number of first time units to a total number of all time units included in the time domain resource is calculated.

For example, as shown in FIG. 5, the time-domain resource pre-allocated by the base station for the terminal to transmit the uplink data includes 14 time units, the location where the target time unit is located is a sixth time unit, and the total number of first time units is five, and then the percentage is 0.36.

In step 102-3, if the percentage is less than or equal to the value of the target indication parameter, it is determined that the target transmission mode is a first transmission mode, otherwise it is determined that the target transmission mode is a second transmission mode.

In this step, it is assumed that the value of the target indication parameter is 0.5. If the percentage calculated in the step 102-2 is less than or equal to the target value, then it may be determined that the target transmission mode is the first transmission mode, and if the percentage is greater than the target value, it may be determined that the target transmission mode is the second transmission mode.

Regarding the above step 103, in the embodiments of the present disclosure, if it is determined that the target transmission mode is the first transmission mode, then the step 103 may specifically be that the uplink data is transmitted to the base station starting from the target time unit.

For example, as shown in FIG. 6, at this time, the total number of first time units is small, and the number of time units that the terminal may occupy is large. Therefore, the terminal may transmit the uplink data to the base station through the channel starting from the target time unit, which avoids the problem of resource waste caused by the inability of the base station to demodulate the uplink data.

If the terminal determines that the target transmission mode is the second transmission mode, with reference to FIG. 7, which is a flowchart showing another uplink transmission method according to an embodiment shown in FIG. 4, the step 103 may include the following steps.

In step 103-1, at least one of a preset number of candidate data packets is selected as the target data packet; and transmission of each candidate data packet occupies a preset number of time units.

In this step, if the preset number is one, the terminal may directly use the candidate data packet as the target data packet.

If the preset number is multiple, the terminal needs to select a target number of candidate data packets as the target data packets.

For example, the preset number is 3, the transmission of data packet 1 needs to occupy two time units, the transmission of data packet 2 needs to occupy two time units, the transmission of data packet 3 needs to occupy three time units, a total number of second time units is seven, then it may be determined that the target number is three, that is, all candidate data packets may be used as the target data packets.

If the total number of second time units is five, the data packet 1 and the data packet 3 may be used as the target data packets, or the data packet 2 and the data packet 3 may be used as the target data packets.

In step 103-2, starting from a first one of the time unit after the target time unit, the target data packet is transmitted to the base station according to a preset data packet transmission sequence, after the uplink data is carried by the target data packet.

In the embodiments of the present disclosure, optionally, the data packet transmission sequence may be predefined in the protocol, or the base station may notify the terminal of the data packet transmission sequence through the scheduling signaling. In addition, the base station may send the scheduling information corresponding to each candidate data packet to the terminal through at least one scheduling signaling in advance.

In this step, after the terminal has selected the target data packet, and also determined the number of time units occupied by the transmission of each target data packet, at this time, by making the target data packet carry the uplink data, based on the related art, the terminal may send the target data to the base station according to the preset data packet transmission sequence starting from the first one of the time unit after the target time unit.

Through the above processes, the base station does not need to configure multiple scheduling signaling for each possible starting position of the uplink data, which saves scheduling signaling resources, and when there are more first time units, that is, the time units that the terminal may occupy are fewer, the uplink data is carried by the target data packet of which the transmission occupies a preset number of time units, thereby avoiding the problem that the transmitted uplink data cannot be decoded on the base station side and also avoiding the resource waste.

The step 103 is further exemplified.

Example 1, the time domain resource pre-allocated by the base station for the terminal to transmit the uplink data includes 14 time units, the total number of first time units is five, the percentage is 0.36, and the target value is 0.5. At this time, the terminal may use the method shown in FIG. 6 to transmit the uplink data to the base station.

Example 2, the time domain resource pre-allocated by the base station for the terminal to transmit the uplink data includes 14 time units, the total number of first time units is eight, then the percentage is 0.57, and the target value is 0.5. At this time, it is required to use the second transmission mode to transmit the uplink data.

Figure 8A:
FIGS. 8A to 8B are schematic diagrams showing uplink transmission scenarios according to an exemplary embodiment.

Assuming that the preset number is one, the candidate data packet is the data packet 1, and the transmission of the candidate data packet occupies two time units. In this case, the terminal uses the data packet 1 as the target data packet, and carries the uplink data through the data packet 1 occupying two time units, as shown in FIG. 8A.

Example 3, the time domain resource pre-allocated by the base station for the terminal to transmit the uplink data includes 14 time units, the total number of first time units is 8, then the percentage is 0.57, and the target value is 0.5. At this time, it is required to use the second transmission mode to transmit the uplink data.

Figure 8B:
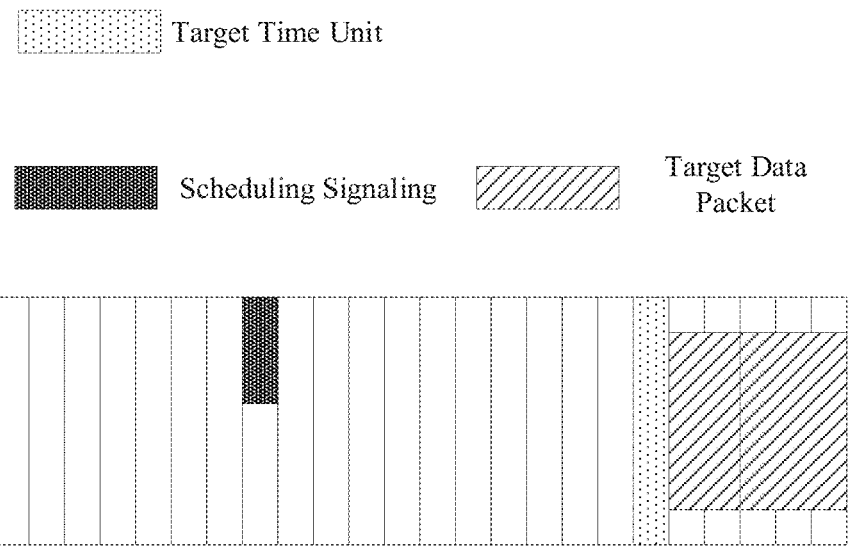
Figure 9:
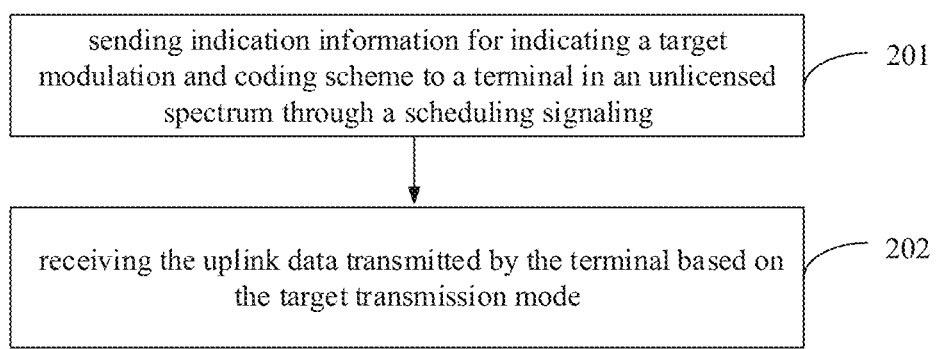
FIG. 9 is a flowchart showing another uplink transmission method according to an exemplary embodiment.

Assuming that the preset number is 3, the transmission of the data packet 1 needs to occupy two time units, the transmission of the data packet 2 needs to occupy two time units, the transmission of the data packet 3 needs to occupy three time units, and total number of the second time units is 5, the target number may be determined to be 2, that is, the data packet 1 and the data packet 3 may be used as the target data packets to carry the uplink data. The preset data packet transmission sequence is the data packet 1, the data packet 2, and the data packet 3, the target data packet sent by the terminal is shown in FIG. 8B.

Next, the uplink transmission method provided by the embodiments of the present disclosure will be introduced from the base station side in the unlicensed spectrum.

The embodiments of the present disclosure provide another uplink transmission method, which may be applied to a base station in an unlicensed spectrum. Referring to 9, which is a flowchart showing another uplink transmission method according to an embodiment, and the method may include the following steps:

In step 201, indication information for indicating a target modulation and coding scheme is sent to a terminal in an unlicensed spectrum through a scheduling signaling, and a value of a target indication parameter corresponding to the target modulation and coding scheme is determined by the terminal according to a predetermined mapping relationship between multiple modulation and coding schemes and multiple candidate values of the target indication parameter in a one-to-one correspondence;

the target modulation and coding scheme is a modulation and coding scheme that should be adopted when the terminal transmits the uplink data; and the target indication parameter is used for indicating a target transmission mode that should be adopted when the terminal transmits uplink data;

in step 202, the uplink data transmitted by the terminal is received based on the target transmission mode.

In the above embodiment, the base station may send the indication information for indicating the target modulation and coding scheme to the terminal through the scheduling signaling, and the terminal may determine the value of the target indication parameter according to the mapping relationship, and further determines the target transmission mode according to the target indication parameter, and the base station receives the uplink data transmitted by the terminal based on the target transmission mode. Through the above processes, the base station may indirectly inform the terminal of the target indication parameter, which is convenient for the terminal to determine the target transmission mode based on the target indication parameter, which has high availability.

For the above step 201, the base station may send the indication information for indicating the target modulation and coding scheme to the terminal through the scheduling signaling. The base station has previously sent Table 1 to the terminal through the RRC signaling, the MAC CE, or the physical layer signaling. The terminal may look up the candidate value corresponding to the target modulation and coding scheme according to Table 1, so as to determine the value of the target indication parameter.

For the above step 202, after determining the value of the target indication parameter, the terminal may determine the target transmission mode, and the base station may directly receive the uplink data transmitted by the terminal using the target transmission mode.

In an embodiment, the terminal may directly obtain the value of the target indication parameter predefined in the protocol, thereby determining the target transmission mode according to the value of the target indication parameter, and the base station directly receives the uplink data transmitted by the terminal based on the target transmission mode.

In an embodiment, the target indication parameter is sent to the terminal through the preset signaling.

The base station may also send the value of the target indication parameter configured for the terminal to the terminal through the preset signaling. The preset signaling may be the RRC signaling, the MAC CE, or the physical layer signaling, such as the scheduling signaling, Optionally, the base station may preset the information domain corresponding to the target indication parameter in the scheduling signaling, and when sending the scheduling signaling, the base station may send the value of the target indication parameter to the terminal through the information domain.

After the terminal determines the target transmission mode according to the value of the target indication parameter according to the above steps 102 to 103, the target transmission mode is adopted to transmit the uplink data to the base station.

Figure 10:
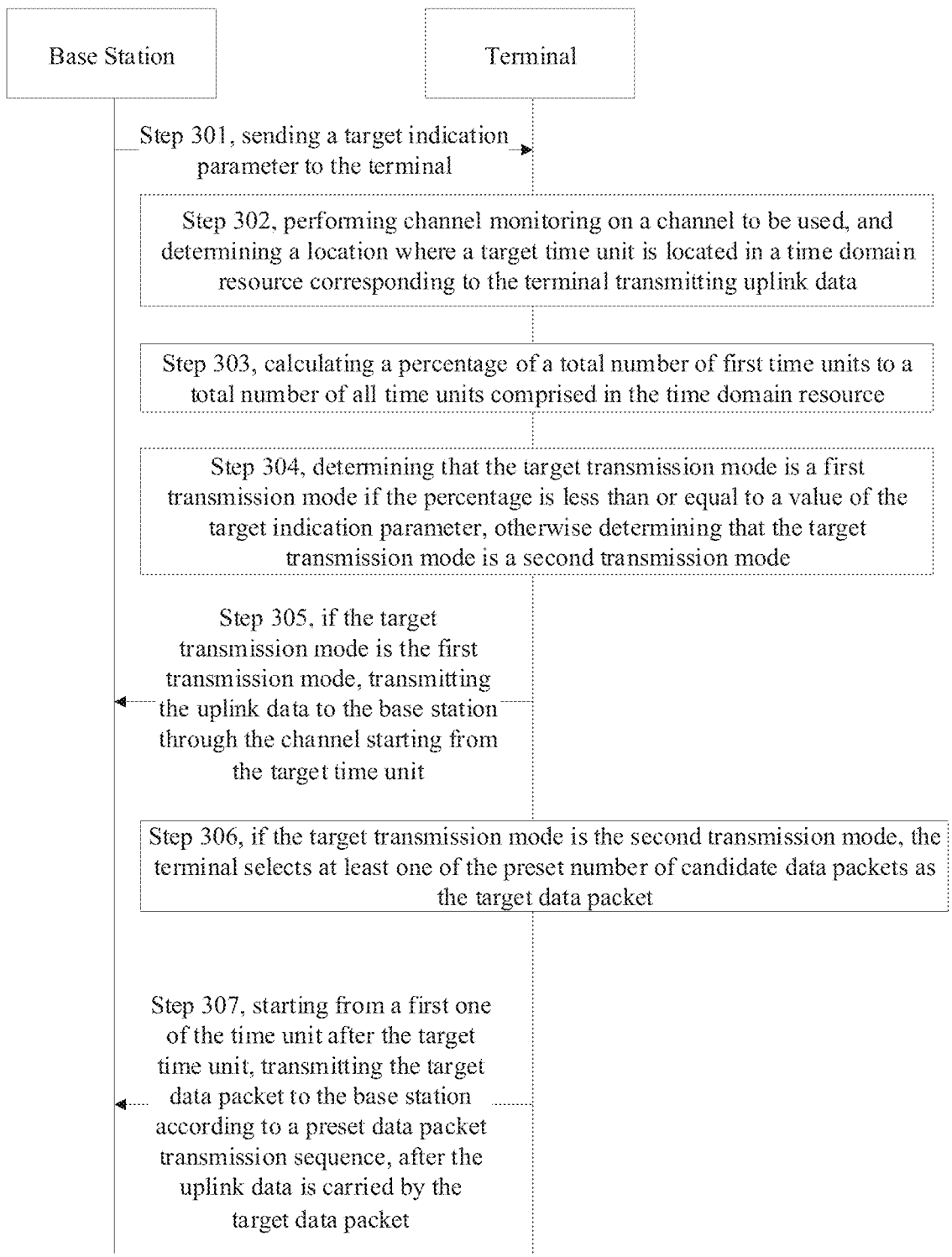
FIG. 10 is a block diagram showing an uplink transmission apparatus according to an exemplary embodiment.

In an embodiment, with reference to FIG. 10, which is a flowchart showing another uplink transmission method according to an embodiment, and the uplink transmission method may include the following steps:

In step 301, the base station sends the target indication parameter to the terminal.

Optionally, the base station may send the target indication parameter to the terminal through the preset signaling or the information domain corresponding to the target indication parameter in the scheduling signaling.

In step 302, the terminal performs the channel monitoring on the channel to be used, and determines the location where the target time unit is located in the time domain resource corresponding to the terminal transmitting the uplink data.

The target time unit is a starting time unit when it is monitored that the channel is in an idle state.

In step 303, the terminal calculates the percentage of the total number of first time units to the total number of all time units included in the time domain resource.

In step 304, if the percentage is less than or equal to the value of the target indication parameter, the target transmission mode is determined to be the first transmission mode, otherwise the target transmission mode is determined to be the second transmission mode.

In step 305, if the target transmission mode is the first transmission mode, the terminal transmits the uplink data to the base station through the channel starting from the target time unit.

In step 306, if the target transmission mode is the second transmission mode, the terminal selects at least one of the preset number of candidate data packets as the target data packet.

The transmission of each candidate data packet occupies the preset number of time units.

In step 307, starting from a first one of the time unit after the target time unit, the target data packet is transmitted to the base station according to a preset data packet transmission sequence, after the uplink data is carried by the target data packet.

In the above embodiments, when determining the target transmission mode, the terminal may monitor the channel to be used, and determine the location where the target time unit is located in the time domain resource corresponding to the terminal transmitting the uplink data. When the total number of first time units is small, the terminal may adopt the first transmission mode to directly transmit the uplink data starting from the target time unit, thereby avoiding the resource waste. When the total number of first time units is large, the terminal may adopt the second transmission mode to select at least one of the preset number of candidate data packets as the target data packet. Starting from the first one of the time unit after the target time unit, the terminal transmits the target data packet to the base station according to the preset data packet transmission sequence, after the uplink data is carried by the target data packet. Through the above processes, at least one of the candidate data packets of which the transmission occupies the preset number of time units may be used as the target data packet to carry the uplink data, thereby avoiding a problem that the transmitted uplink data cannot be decoded on the base station side when the number of first time units is large, and avoiding the waste of resources.

In the above embodiments, the base station may also send Table 1 to the terminal in advance through the preset signaling. Further, the base station sends the target modulation and coding scheme to the terminal through the scheduling signaling, and the terminal may look up the value corresponding to the target modulation and coding scheme as the value of the target indication parameter according to Table 1 sent by the base station or table 1 predefined in the protocol, and then perform the above steps 302 to 308.

Corresponding to the foregoing application function implementation method embodiments, the present disclosure also provides application function implementation apparatus, and corresponding terminal and base station embodiments.

Figure 11:
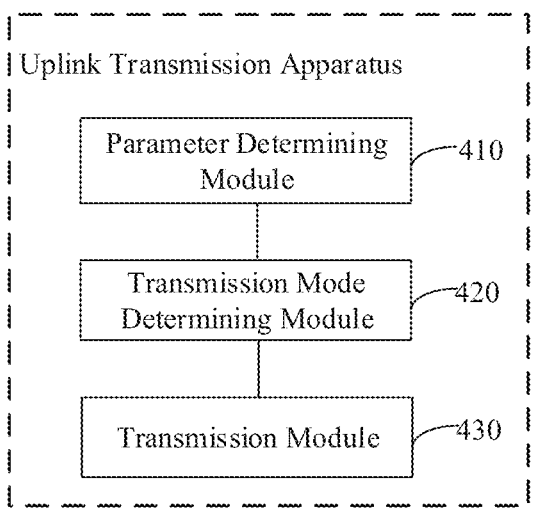
FIG. 11 is a block diagram showing another uplink transmission apparatus according to an exemplary embodiment.

Referring to FIG. 11, FIG. 11 is a block diagram showing an uplink transmission apparatus according to an exemplary embodiment. The apparatus is applied to a terminal in the unlicensed spectrum, and includes:

a parameter determining module 410, configured to determine a target indication parameter, wherein the target indication parameter is used for indicating a target transmission mode that should be adopted when the terminal transmits uplink data;

a transmission mode determining module 420, configured to determine the target transmission mode according to the target indication parameter; and a transmission module 430, configured to transmit the uplink data to a base station in an unlicensed spectrum on the basis of the target transmission mode.

Figure 12:
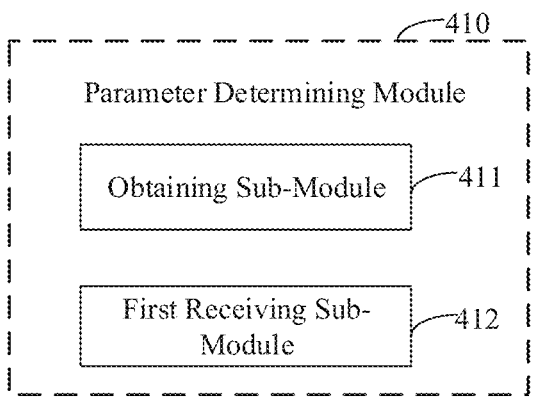
FIG. 12 is a block diagram showing another uplink transmission apparatus according to an exemplary embodiment.

Referring to FIG. 12, FIG. 12 is a block diagram showing another uplink transmission apparatus based on the embodiment shown in FIG. 11. The parameter determining module 410 includes:

- an obtaining sub-module 411, configured to obtain the target indication parameter predefined in a protocol; or
- a first receiving sub-module 412, configured to receive the target indication parameter sent by the base station through a preset signaling.

Figure 13:
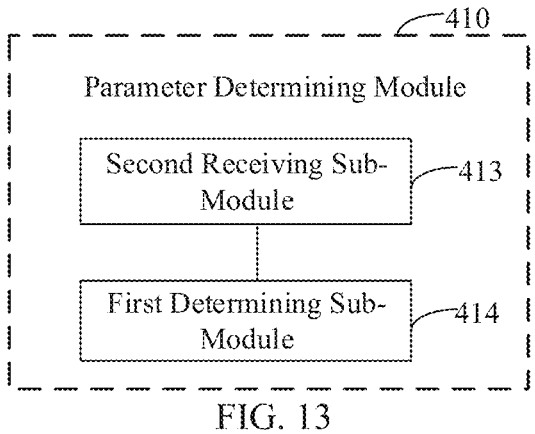
FIG. 13 is a block diagram showing another uplink transmission apparatus according to an exemplary embodiment.

Referring to FIG. 13, FIG. 13 is a block diagram showing another uplink transmission apparatus based on the embodiment shown in FIG. 11. The parameter determining module 410 includes:

- a second receiving sub-module 413, configured to receive indication information for indicating a target modulation and coding scheme sent by the base station through a scheduling signaling, wherein the target modulation and coding scheme is a modulation and coding scheme that should be adopted when the terminal transmits the uplink data; and
- a first determining sub-module 414, configured to determine a value of the target indication parameter corresponding to the target modulation and coding scheme according to a predetermined mapping relationship between multiple modulation and coding schemes and multiple candidate values of the target indication parameter in a one-to-one correspondence.

Figure 14:
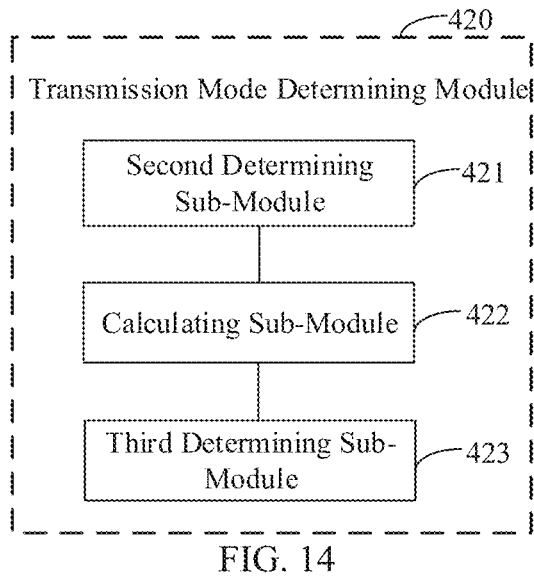
FIG. 14 is a block diagram showing another uplink transmission apparatus according to an exemplary embodiment.

Referring to FIG. 14, FIG. 14 is a block diagram showing another uplink transmission apparatus based on the embodiment shown in FIG. 11. The transmission mode determining module 420 includes:

- a second determining sub-module 421, configured to perform channel monitoring on a channel to be used, and determine a location where a target time unit is located in a time domain resource corresponding to the terminal transmitting the uplink data, wherein the target time unit is a starting time unit when it is monitored that the channel is in an idle state;
- a calculating sub-module 422, configured to calculate a percentage of a total number of first time units to a total number of all time units included in the time domain resource, wherein the first time units are time units located before the target time unit in the time domain resource; and
- a third determining sub-module 423, configured to determine that the target transmission mode is a first transmission mode if the percentage is less than or equal to the value of the target indication parameter, otherwise determine that the target transmission mode is a second transmission mode.

Figure 15:
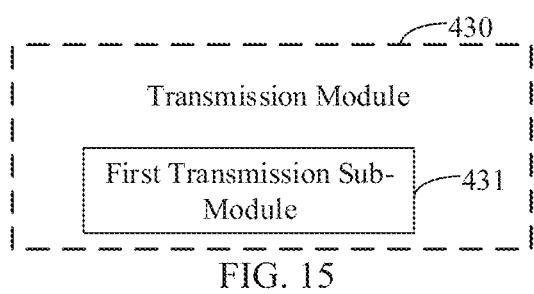
FIG. 15 is a block diagram showing another uplink transmission apparatus according to an exemplary embodiment.

Referring to FIG. 15, FIG. 15 is a block diagram showing another uplink transmission apparatus based on the embodiment shown in FIG. 14. The transmission module 430 includes:

- a first transmission sub-module 431, configured to transmit the uplink data to the base station starting from the target time unit if the target transmission mode is the first transmission mode.

Figure 16:
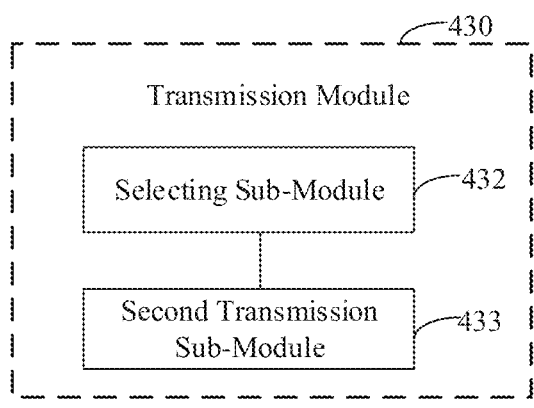
FIG. 16 is a block diagram showing another uplink transmission apparatus according to an exemplary embodiment.

Referring to FIG. 16, FIG. 16 is a block diagram showing another uplink transmission apparatus based on the embodiment shown in FIG. 14. The transmission module 430 includes:

- a selecting sub-module 432, configured to select at least one of a preset number of candidate data packets as the target data packet if the target transmission mode is a second transmission mode; wherein transmission of each candidate data packet occupies a preset number of time units; and
- a second transmission sub-module 433, configured to transmit the target data packet to the base station according to a preset data packet transmission sequence, starting from a first one of the time unit after the target time unit, after the uplink data is carried by the target data packet.

Figure 17:
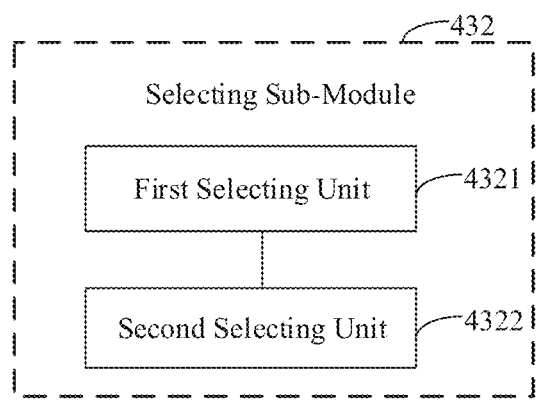
FIG. 17 is a block diagram showing another uplink transmission apparatus according to an exemplary embodiment.

Referring to FIG. 17, FIG. 17 is a block diagram showing another uplink transmission apparatus based on the embodiment shown in FIG. 16. The selecting sub-module 432 includes:

- a first selecting unit 4321, configured to use the candidate data packet as the target data packet if the preset number is one;
- a second selecting unit 4322, configured to select a target number of candidate data packets as target data packets according to the preset number of time units occupied by the transmission of each candidate data packet and a total number of second time units if the preset number is multiple;
- wherein, the second time unit is a time unit located after the target time unit in the time domain resource, and a total number of time units occupied by transmission of the target number of candidate data packets is largest while does not exceed the total number of second time units. In other words, the total number of time units occupied by transmission of the target number of candidate data packets is larger than the total number of time units occupied by transmission of any other possible combination of the candidate data packets, while the valve shall not exceed the total number of second time units. That is, the combination of the candidate data packets which requires more time units than the total number of second time units shall be excluded.

Figure 18:
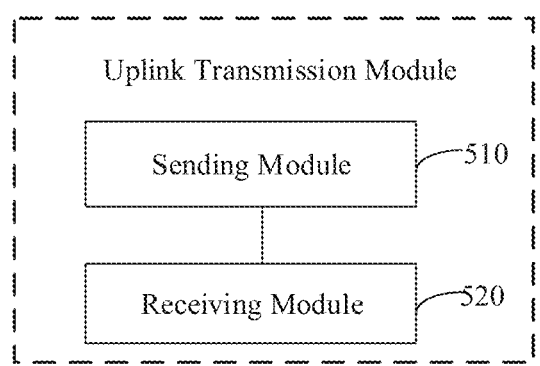
FIG. 18 is a block diagram showing another uplink transmission apparatus according to an exemplary embodiment.

Referring to FIG. 18, FIG. 18 is a block diagram showing an uplink transmission apparatus according to an exemplary embodiment. The apparatus is, applied to a base station in an unlicensed spectrum, and includes:

- a sending module 510, configured to send indication information for indicating a target modulation and coding scheme to a terminal in the unlicensed spectrum through a scheduling signaling, wherein a value of a target indication parameter corresponding to the target modulation and coding scheme is determined by the terminal according to a predetermined mapping relationship between multiple modulation and coding schemes and multiple candidate values of the target indication parameter in a one-to-one correspondence;
- wherein the target modulation and coding scheme is a modulation and coding scheme that should be adopted when the terminal transmits the uplink data; and the target indication parameter is used for indicating a target transmission mode that should be adopted when the terminal transmits uplink data;
- a receiving module 520, configured to receive the uplink data transmitted by the terminal based on the target transmission mode.

Details regarding the apparatus embodiments, since they basically correspond to the method embodiments, the relevant parts can be referred to the description of the method embodiments. The apparatus embodiments described above are only exemplary. The units described as separated parts may or may not be physically separated, and the parts displayed as units may or may not be physical units, that is, the units may be located in one place, or may be distributed over multiple network units. Some or all of the modules may be selected according to actual needs to achieve the objectives of the solutions in the embodiments. Those of ordinary skill in the art can understand and implement without paying creative labor.

Correspondingly, the present disclosure also provides a computer-readable storage medium having a computer program stored thereon, and the computer program is configured to execute any one of the uplink transmission methods for the terminal in the unlicensed spectrum.

Correspondingly, the present disclosure also provides a computer-readable storage medium having a computer program stored thereon, and the computer program is configured to execute any one of the uplink transmission methods for the base station in the unlicensed spectrum.

Correspondingly, the present disclosure also provides an uplink transmission apparatus, applied to a terminal in an unlicensed spectrum, including:

a processor; and a memory for storing executable instructions of the processor;

wherein, the processor is configured to:

determine a target indication parameter, wherein the target indication parameter is used for indicating a target transmission mode that should be adopted when the terminal transmits uplink data;

determine the target transmission mode according to the target indication parameter; and transmit the uplink data to a base station in an unlicensed spectrum on the basis of the target transmission mode.

Figure 19:
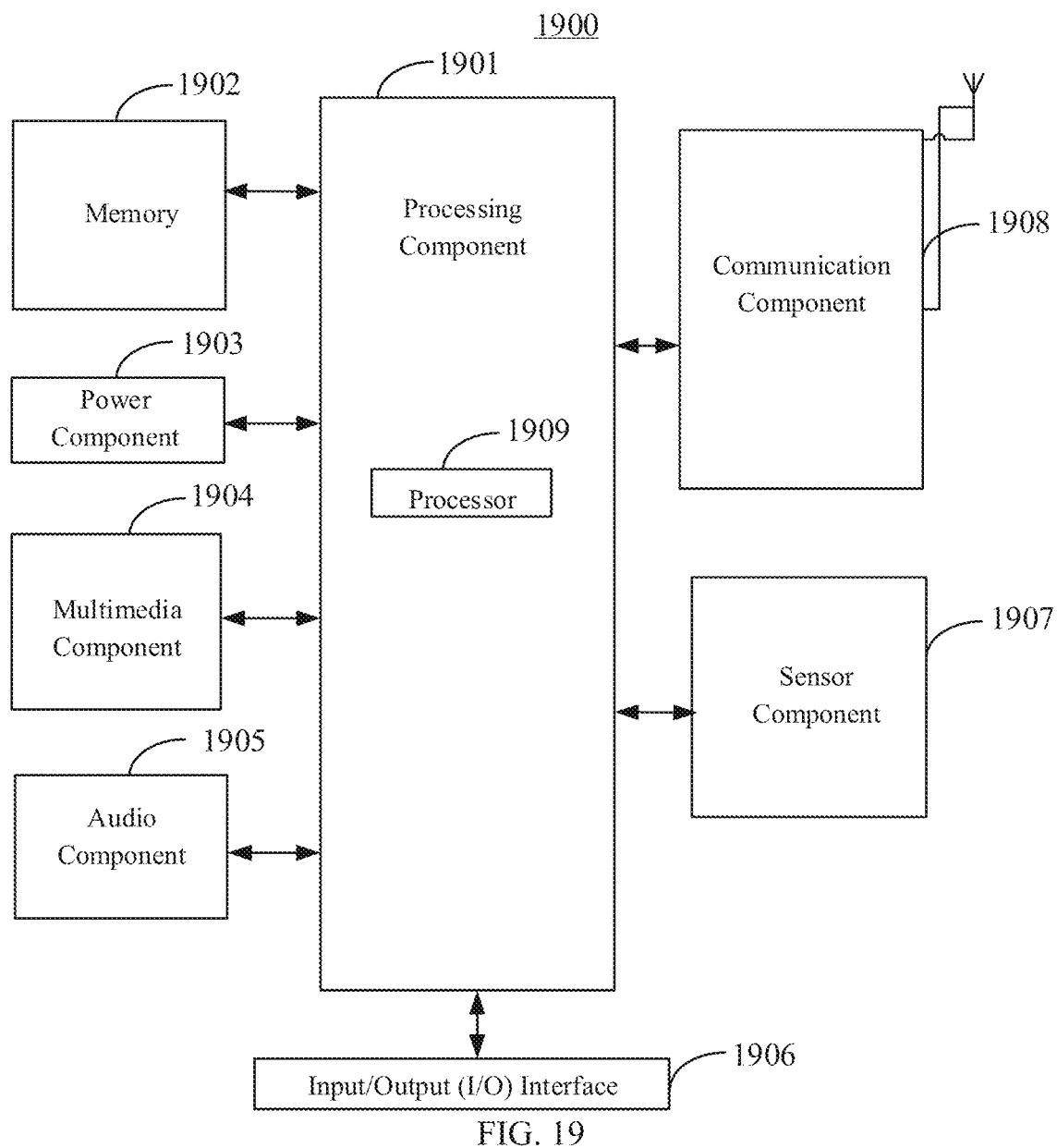
FIG. 19 is a schematic diagram showing a structure for an uplink transmission apparatus according to an exemplary embodiment.

FIG. 19 is a schematic structural diagram showing an uplink transmission apparatus according to an exemplary embodiment. As shown in FIG. 19, an uplink transmission apparatus 1900 is shown according to an exemplary embodiment. The apparatus 1900 may be a terminal in the unlicensed spectrum, such as a computer, a mobile phone, a digital broadcasting terminal, a messaging device, a game console, a tablet device, a medical device, a fitness device, a personal digital assistant and the like.

Referring to FIG. 19, the apparatus 1900 may include one or more of the following components: a processing component 1901, a memory 1902, a power component 1903, a multimedia component 1904, an audio component 1905, an input/output (I/O) interface 1906, a sensor component 1907, and a communication component 1908.

The processing component 1901 typically controls the overall operations of the apparatus 1900, such as the operations associated with display, telephone calls, data communications, camera operations, and recording operations. The processing component 1901 can include one or more processors 1920 to execute instructions to perform all or part of the steps in the above described methods. Moreover, the processing component 1901 can include one or more modules to facilitate the interaction between the processing component 1901 and other components. For example, the processing component 1901 can include a multimedia module to facilitate the interaction between the multimedia component 1904 and the processing component 1901.

The memory 1902 is configured to store various types of data to support the operation of the apparatus 1900. Examples of such data include instructions for any application or method operated on apparatus 1900, such as the contact data, the phone book data, messages, pictures, videos, and the like. The memory 1902 may be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1903 provides power to various components of the apparatus 1900. The power component 1903 can include a power management system, one or more power sources, and other components associated with the generation, management, and distribution of power in the apparatus 1900.

The multimedia component 1904 includes a screen providing an output interface between the apparatus 1900 and the user t. In some embodiments, the screen can include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1904 includes a front camera and/or a rear camera. When the apparatus 1900 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1905 is configured to output and/or input an audio signal. For example, the audio component 1905 includes a microphone (MIC) configured to receive an external audio signal when the apparatus 1900 is in an operation mode, such as a call mode, a recording mode, and a voice recognition mode. The received audio signal may be further stored in the memory 1902 or sent via the communication component 1908. In some embodiments, the audio component 1905 also includes a speaker for outputting the audio signal.

The I/O interface 1906 provides an interface between the processing component 1901 and peripheral interface modules, such as a keyboard, a click wheel, buttons, and the like. These buttons may include, but are not limited to, a home button, a volume button, a starting button, and a locking button.

The sensor component 1907 includes one or more sensors for providing status assessments of various aspects of the apparatus 1900. For example, the sensor component 1907 can detect an open/closed status of the apparatus 1900, relative positioning of components, such as the display and the keypad of the apparatus 1900. The sensor component 1907 can also detect a change in position of one component of the apparatus 1900 or the apparatus 1900, the presence or absence of user contact with the apparatus 1900, an orientation, or an acceleration/deceleration of the apparatus 1900, and a change in temperature of the apparatus 1900. The sensor component 1907 can include a proximity sensor configured to detect the presence of nearby objects without any physical contact. The sensor component 1907 can also include a light sensor, such as a CMOS or CCD image sensor, configured to use in imaging applications. In some embodiments, the sensor component 1907 can also include an accelerometer sensor, a gyroscope sensor, a magnetic sensor, a pressure sensor, or a temperature sensor.

The communication component 1908 is configured to facilitate wired or wireless communication between the apparatus 1900 and other apparatuses. The apparatus 1900 can access a wireless network based on a communication standard, such as WiFi, 2G or 3G, or a combination thereof. In an exemplary embodiment, the communication component 1908 receives broadcast signals or broadcast associated information from an external broadcast management system via a broadcast channel. In an exemplary embodiment, the communication component 1908 also includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 1900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, and configured to perform the above methods.

In an exemplary embodiment, there is also provided a non-transitory computer-readable storage medium including instructions, such as a memory 1902 including instructions executable by the processor 1909 of the apparatus 1900 to perform the above described method. For example, the non-transitory computer readable storage medium may be a ROM, a random access memory (RAM), a CD-ROM, a magnetic tape, a floppy disc, and an optical data storage device.

When the instructions in the storage medium are executed by the processor, the apparatus 1900 may execute the uplink transmission method for the terminal side in the unlicensed spectrum described in any of the foregoing embodiments.

Correspondingly, the present disclosure also provides an uplink transmission apparatus, applied to the base station in the unlicensed spectrum, and including:
a processor; and
a memory for storing executable instructions of the processor;
wherein, the processor is configured to:
receive the uplink data transmitted by the terminal based on the target transmission mode; the target transmission mode is a transmission mode that should be adopted when the terminal transmits the uplink data indicated by the target indication parameter.

Figure 20:
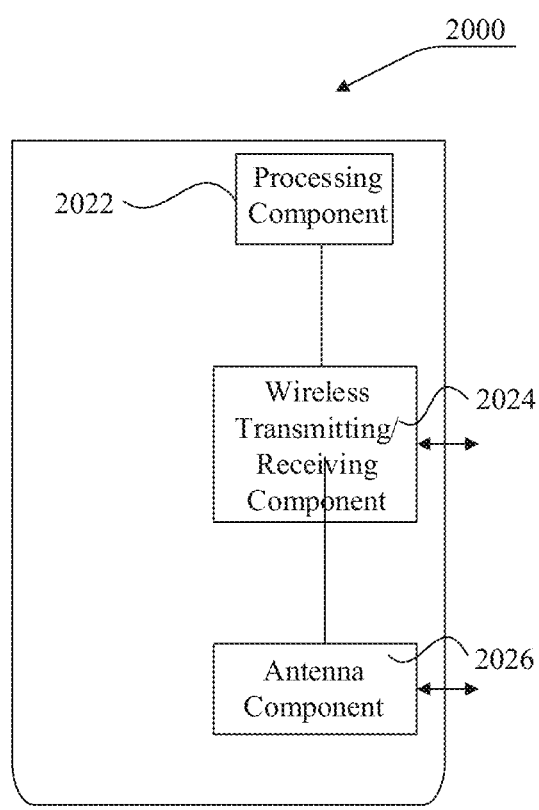
FIG. 20 is a schematic diagram showing another structure for an uplink transmission apparatus according to an exemplary embodiment.

As shown in FIG. 20, FIG. 20 is a schematic structural diagram showing an uplink transmission apparatus 2000 according to an exemplary embodiment. The apparatus 2000 may be provided as a base station. Referring to FIG. 20, the apparatus 2000 includes a processing component 2022, a wireless transmitting/receiving component 2024, an antenna component 2026, and a signal processing part specific to the wireless interface. The processing component 2022 may further include one or more processors.

One of the processors in the processing component 2022 may be configured to perform the uplink transmission method for the base station side in the unlicensed spectrum mentioned above.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

The technical solutions provided by the embodiments of the present disclosure may include the following beneficial effects.

In the embodiments of the present disclosure, the terminal may first determine the target indication parameter, and then the terminal determines the target transmission mode that should be adopted when transmitting the uplink data according to the target indication parameter, and transmits the uplink data to the base station in the unlicensed spectrum based on the target transmission mode. Through the above processes, the target transmission mode that should be adopted when the terminal transmits the uplink data may be indicated by the target indication parameter, which solves a problem of resource waste caused by the uncertainty of channel occupation in the unlicensed spectrum.

In the embodiments of the present disclosure, the terminal may directly obtain the target indication parameter predefined in the protocol, or receive the target indication parameter sent by the base station through the preset signaling. In addition, the terminal may also determine the value of the target indication parameter corresponding to the target modulation and coding scheme indicated by the base station through the scheduling signaling according to the predetermined mapping relationship between the multiple modulation and coding schemes and the multiple candidate values of the target indication parameter in the one-to-one correspondence. The terminal may determine the target indication parameter in any of the above-mentioned ways, which is easy to implement and has high usability.

In the embodiments of the present disclosure, when determining the target transmission mode, the terminal may monitor the channel to be used, and determine the location where the target time unit is located in the time domain resource corresponding to the terminal transmitting the uplink data, and the target time unit is the starting time unit when it is monitored that the channel is in the idle state. Further, the terminal calculates the percentage of the total number of first time units to the total number of all time units included in the time domain resource. If the percentage is less than or equal to the value of the target indication parameter, the first transmission mode may be used, otherwise the second transmission mode is used. Through the above processes, the target transmission mode that needs to be adopted may be determined according to the target indication parameter, which avoids the problem of resource waste caused by the uncertainty of channel occupation in the unlicensed spectrum.

In the embodiments of the present disclosure, when the total number of first time units is small, the terminal may adopt the first transmission mode to directly transmit the uplink data starting from the target time unit, thereby avoiding the resource waste.

In the embodiments of the present disclosure, when the total number of first time units is large, the terminal may adopt the second transmission mode to select at least one of the preset number of candidate data packets as the target data packet, and the transmission of each candidate data packet occupies the preset number of time units. Starting from the first one of the time unit after the target time unit, the terminal transmits the target data packet to the base station according to the preset data packet transmission sequence, after the uplink data is carried by the target data packet. Through the above processes, at least one of the candidate data packets of which the transmission occupies the preset number of time units may be used as the target data packet to carry the uplink data, thereby avoiding a problem that the transmitted uplink data cannot be decoded on the base station side when the number of first time units is large, and avoiding the waste of resources.

In the embodiments of the present disclosure, if the preset number is one, the candidate data packet is directly used as the target data packet. If the preset number is multiple, the terminal may select the target number of candidate data packets as the target data packets according to the preset number of time units occupied by the transmission of each candidate data packet and the total number of second time units, and the second time unit is a time unit located after the target time unit in the time domain resource, and the total number of time units occupied by transmission of the target number of candidate data packets is largest while does not exceed the total number of second time units. Through the above processes, it is possible to avoid the problem that the transmitted uplink data cannot be decoded on the base station side when the number of first time units is large, and avoid the waste of resources.

It should be understood that the present disclosure is not limited to the precise structures that have been described above and shown in the drawings, and various modifications and changes may be made without departing from the scope thereof. The scope of the present disclosure is limited only by the appended claims.

What is claimed is:

1. An uplink transmission method, comprising:
   determining, by a terminal in an unlicensed spectrum, a target indication parameter, wherein the target indication parameter is used for indicating a target transmission mode adopted in response to determining that the terminal transmits uplink data;
   determining, by the terminal, the target transmission mode according to the target indication parameter; and
   transmitting, by the terminal, the uplink data to a base station in the unlicensed spectrum on the basis of the target transmission mode,
   wherein determining the target transmission mode according to the target indication parameter comprises:
   performing channel monitoring on a channel to be used, and determining a location where a target time unit is located in a time domain resource corresponding to the terminal transmitting the uplink data, wherein the target time unit is a starting time unit in response to monitoring that the channel is in an idle state;
   calculating a percentage of a total number of first time units to a total number of all time units comprised in the time domain resource, wherein the first time units are time units located before the target time unit in the time domain resource; and
   determining that the target transmission mode is a first transmission mode in response to determining that the percentage is less than or equal to a value of the target indication parameter, and determining that the target transmission mode is a second transmission mode in response to determining that the percentage is greater than the value of the target indication parameter.

2. The method according to claim 1, wherein determining the target indication parameter comprises:
   obtaining the target indication parameter predefined in a protocol; or
   receiving the target indication parameter sent by the base station through a preset signaling.

3. The method according to claim 1, wherein determining the target indication parameter comprises:
   receiving indication information for indicating a target modulation and coding scheme sent by the base station through a scheduling signaling, wherein the target modulation and coding scheme is a modulation and coding scheme adopted in response to determining that the terminal transmits the uplink data; and
   determining a value of the target indication parameter corresponding to the target modulation and coding scheme according to a predetermined one-to-one mapping relationship between multiple modulation and coding schemes and multiple candidate values of the target indication parameter.

4. The method according to claim 1, wherein in response to determining that the target transmission mode is the first transmission mode, transmitting the uplink data to the base station based on the target transmission mode comprises:
   transmitting the uplink data to the base station starting from the target time unit.

5. The method according to claim 1, wherein in response to determining that the target transmission mode is the second transmission mode, transmitting the uplink data to the base station based on the target transmission mode comprises:
   selecting at least one of a preset number of candidate data packets as the target data packet, wherein transmission of each candidate data packet occupies a preset number of time units; and
   starting from a first time unit following the target time unit, transmitting the target data packet to the base station according to a preset data packet transmission sequence, after the uplink data is carried by the target data packet.

6. The method according to claim 5, wherein selecting the at least one of the preset number of candidate data packets as the target data packet comprises:
   using the candidate data packet as the target data packet in response to determining that the preset number is one; and
   selecting a target number of candidate data packets as target data packets according to the preset number of time units occupied by the transmission of each candidate data packet and a total number of second time units in response to determining that the preset number is greater than one,
   wherein, the second time unit is a time unit located after the target time unit in the time domain resource, and a total number of time units occupied by transmission of the target number of candidate data packets is the greatest and does not exceed the total number of second time units.

7. An uplink transmission apparatus, comprising:
   a processor; and
   a memory for storing executable instructions of the processor,
   wherein, the processor is configured to:
   determine a target indication parameter, wherein the target indication parameter is used for indicating a target transmission mode adopted in response to determining that the terminal transmits uplink data;
   determine the target transmission mode according to the target indication parameter; and
   transmit the uplink data to a base station in an unlicensed spectrum on the basis of the target transmission mode,
   wherein the processor is further configured to:
   perform channel monitoring on a channel to be used, and determine a location where a target time unit is located in a time domain resource corresponding to the terminal transmitting the uplink data, wherein the target time unit is a starting time unit in response to monitoring that the channel is in an idle state;

calculate a percentage of a total number of first time units to a total number of all time units comprised in the time domain resource, wherein the first time units are time units located before the target time unit in the time domain resource; and determine that the target transmission mode is a first transmission mode in response to determining that the percentage is less than or equal to the value of the target indication parameter, and determine that the target transmission mode is a second transmission mode in response to determining that the percentage is greater than the value of the target indication parameter.

8. The apparatus according to claim 7, wherein the processor is further configured to:

obtain the target indication parameter predefined in a protocol; or receive the target indication parameter sent by the base station through a preset signaling.

9. The apparatus according to claim 7, wherein the processor is further configured to:

receive indication information for indicating a target modulation and coding scheme sent by the base station through a scheduling signaling, wherein the target modulation and coding scheme is a modulation and coding scheme adopted in response to determining that the terminal transmits the uplink data; and determine a value of the target indication parameter corresponding to the target modulation and coding scheme according to a predetermined one-to-one mapping relationship between multiple modulation and coding schemes and multiple candidate values of the target indication parameter.

10. The apparatus according to claim 7, wherein the processor is further configured to:

transmit the uplink data to the base station starting from the target time unit in response to determining that the target transmission mode is the first transmission mode.

11. The apparatus according to claim 7, wherein the processor is further configured to:

select at least one of a preset number of candidate data packets as the target data packet in response to determining that the target transmission mode is a second transmission mode, wherein transmission of each candidate data packet occupies a preset number of time units; and starting from a first time unit following the target time unit, transmit the target data packet to the base station according to a preset data packet transmission sequence, after the uplink data is carried by the target data packet.

12. The apparatus according to claim 11, wherein the processor is further configured to:

use the candidate data packet as the target data packet in response to determining that the preset number is one; and select a target number of candidate data packets as target data packets according to the preset number of time units occupied by the transmission of each candidate data packet and a total number of second time units in response to determining that the preset number is greater than one, wherein, the second time unit is a time unit located after the target time unit in the time domain resource, and a total number of time units occupied by transmission of the target number of candidate data packets is the greatest and does not exceed the total number of second time units.

\* \* \* \* \*